United States Patent [19]
Stonehouse

[11] Patent Number: 5,094,124
[45] Date of Patent: Mar. 10, 1992

[54] HANDLEBARS FOR STATIONARY EXERCISE BICYCLE

[75] Inventor: Peter A. Stonehouse, Camarillo, Calif.

[73] Assignee: Western States Import Company, Inc., Camarillo, Calif.

[21] Appl. No.: 709,115

[22] Filed: Jun. 3, 1991

[51] Int. Cl.⁵ .................. B62K 21/12; A63B 21/00
[52] U.S. Cl. .................... 74/551.8; 74/551.1; 272/23
[58] Field of Search ............ 74/551.1–551.8; 272/73

[56] References Cited

U.S. PATENT DOCUMENTS

| | | | |
|---|---|---|---|
| 944,932 | 12/1909 | Abraham | 74/551.8 |
| 1,448,921 | 3/1923 | Ershkowitz | 74/551.8 |
| 1,738,855 | 12/1929 | Thompson | 74/551.8 |
| 2,816,775 | 12/1957 | Costello | 74/551.8 |
| 3,289,493 | 12/1966 | Church | 74/551.8 |
| 3,529,490 | 9/1970 | Pawsat et al. | 74/551.8 X |
| 4,315,583 | 2/1982 | Hine | 74/551.8 X |
| 4,878,397 | 11/1983 | Lennon | 74/551.1 |

FOREIGN PATENT DOCUMENTS 3310130 9/1984 Fed. Rep. of Germany ........ 272/73

Primary Examiner—Vinh T. Luong
Attorney, Agent, or Firm—Edward A. Sokolski

[57] ABSTRACT

Handlebars for a stationary exercise bicycle are mounted on the front post or main body of the bicycle for pivotal adjustment and fixed positioning in a selected pivotal position relative thereto. Such handlebars have a central bar member which is connected to the post and a first larger handlebar section and a second smaller handlebar section which sections are positioned on opposite sides of the central bar member. The first larger handlebar section is in the form of a loop, the ends of which are attached to the ends of the central bar member, this larger handlebar section having a recessed portion positioned directly opposite the central bar member. The second smaller handlebar section is also in the form of a loop the ends of which are attached to the ends of the central bar member and the ends of the larger section. The smaller handlebar section has two substantially straight sides which are interconnected by a third side which is positioned directly opposite the central bar member.

4 Claims, 2 Drawing Sheets

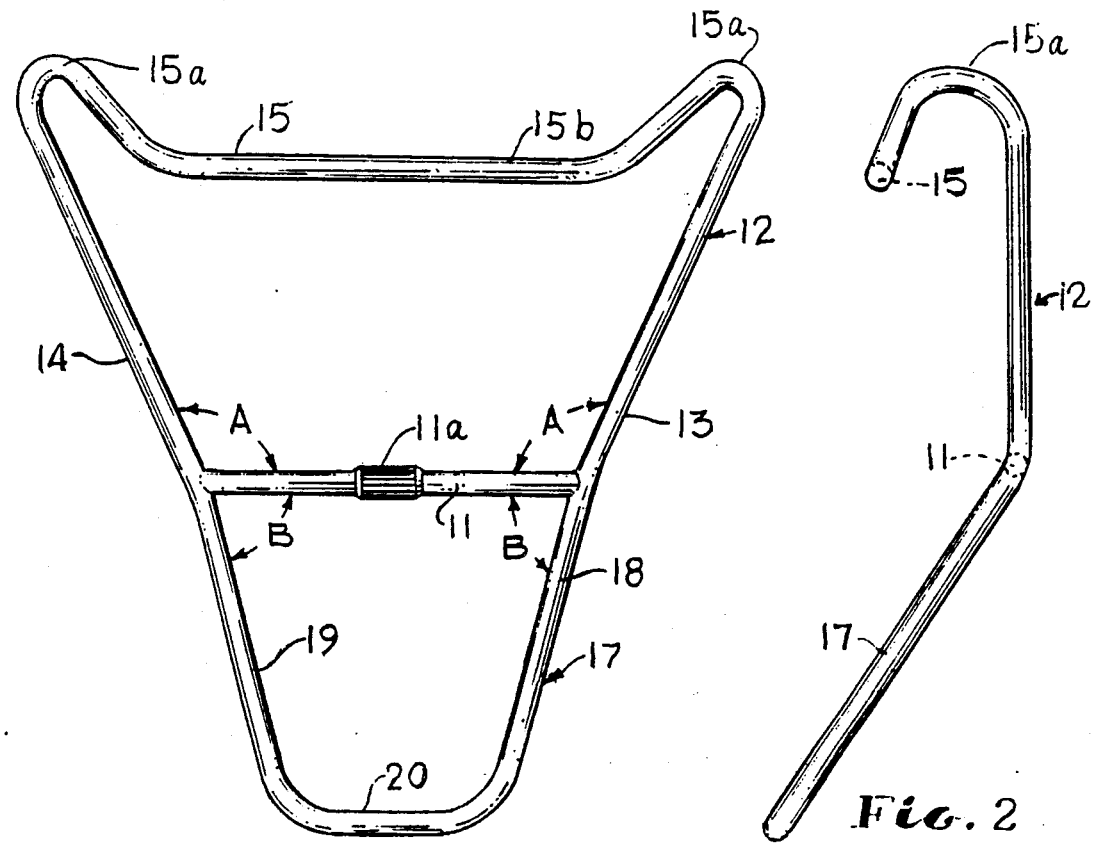
Fig. 1
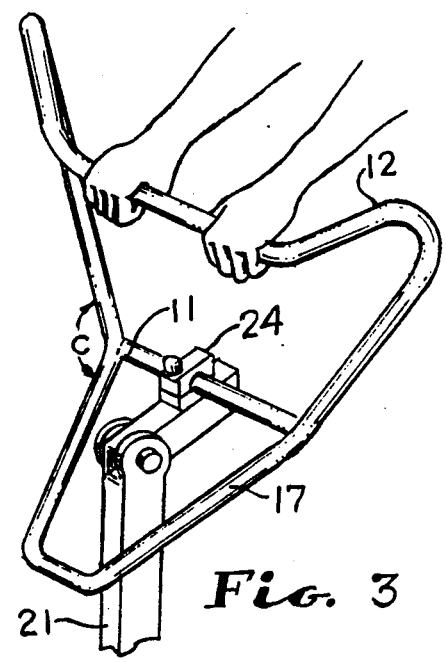
Fig. 2
Fig. 3

HANDLEBARS FOR STATIONARY EXERCISE BICYCLE

BACKGROUND OF THE INVENTION (1) Field of the Invention

This invention relates to handlebars for stationary bicycle exercisers and more particularly to such handlebars which have opposing loop sections and which can be pivotally adjusted on their support and locked into a desired position on the exerciser.

(2) Description of the Related Art

Prior art handlebars for stationary exercise bicycles take various forms ranging from straight bars to bars in various curved and loop configurations. Such bars generally are limited in the gripping positions that they afford and cycling positions that they accommodate. Thus, for persons having physical problems which are being rehabilitated through use of the exerciser, certain gripping positions and positions of the handlebars are required for minimum stress on the user's back and shoulders. On the other hand, where the user is training for bicycle or triathlon racing, racing bicycle positions need to be simulated to optimize such training. Most prior art handlebars are limited in their versatility of use and usually only provide optimum utility for particular purposes. Adjustable loop shaped handlebars are described in U.S. Pat. No. 4,250,770 issued Feb. 17, 1981 to Robertson, Jr., and U.S. Pat. No. 4,750,754 issued June 14, 1988 to Lennon.

The handlebars of the present invention obviate the aforementioned shortcomings of the prior art in providing a great variety of different gripping positions and stances for the user so as to accommodate different user requirements whether they be rehabilitation, normal exercise, or serious training for bicycle racing.

BRIEF SUMMARY OF THE INVENTION

The device of the invention includes a central bar member which is mounted for pivotal adjustment on the "steering" post or main body of a stationary bicycle exerciser. A clamping device is provided to lock the central bar in any pivotal position which may be selected, this clamping device being readily releasable to enable changing of this position should it be so desired.

A first larger handlebar section in the form of a loop has its ends attached to the ends of the central bar. This first handlebar section has a recessed portion in the portion of the loop directly opposite the central bar.

A second smaller handlebar section in the form of a loop is formed with two substantially straight sides which converge towards each other and are interconnected by a third side positioned opposite the central bar. The ends of the straight sides of the second section are attached to the ends of the central bar. The second section is positioned on the opposite side of the central bar from the first section.

The handlebars can be pivotally adjusted on their support to a great variety of vertically and horizontally oriented positions and can be locked in any of these positions which may be selected.

It is therefore an object of this invention to provide handlebars for an exercise bicycle which provides improved versatility of utilization.

It is a further object of this invention to provide handlebars for a bicycle exerciser which can be adjusted for use in a great variety of different horizontal and vertical positions.

Other objects of this invention will become apparent from the following description taken in conjunction with the accompanying drawings.

BRIEF DESCRIPTION OF THE DRAWINGS

FIG. 1 Is a top plan view of a preferred embodiment of the invention;

FIG. 2 is a side elevational view of the preferred embodiment;

FIG. 3 is a perspective view showing the preferred embodiment of the invention in use attached to the post of an exerciser;

DETAILED DESCRIPTION OF THE INVENTION

Figure 4:
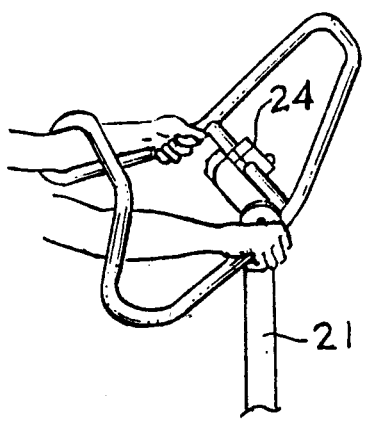
FIGS. 4-7 are a series of drawings showing the preferred embodiment being used in various positions.
Figure 5:
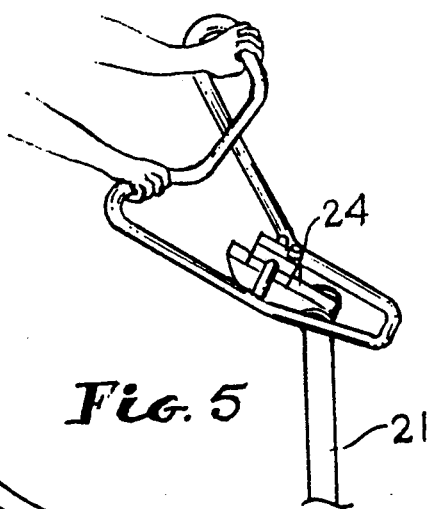
Figure 6:
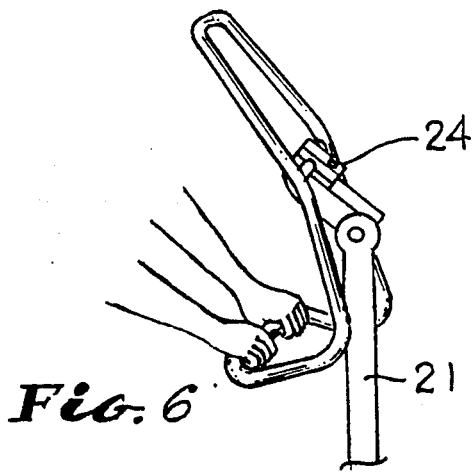
Figure 7:
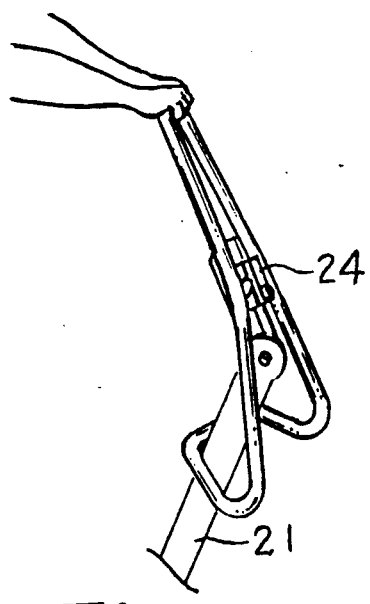

Referring to FIGS. 1-3, a preferred embodiment of the invention is illustrated. A central bar member 11 is formed by a straight tubular bar having a knurled portion 11a near the center thereof. A first larger handlebar section 12 forms a loop the opposite ends of which are attached to the ends of bar member 11. The opposite sides 13 and 14 are substantially straight and diverge outwardly from the bar member at an obtuse angle "A" of about 115 degrees. The third side 15 of handlebar section 12 has curved end portions 15a which extend inwardly and are interconnected by a recessed portion 15b which is positioned directly opposite central bar member 11.

A second smaller handlebar section 17 is in the form of a loop having its opposite ends attached to the ends of central bar member 11. Handlebar section 17 has a pair of substantially straight sides 18 and 19 which extend from central bar member 11 at an acute angle "B" of about 60 degrees, these sides converging towards third side 20 which is positioned directly opposite central bar member 11. Handlebar sections 12 and 17 extend from each other longitudinally at an obtuse angle "C" of about 145 degrees.

Figure 8:
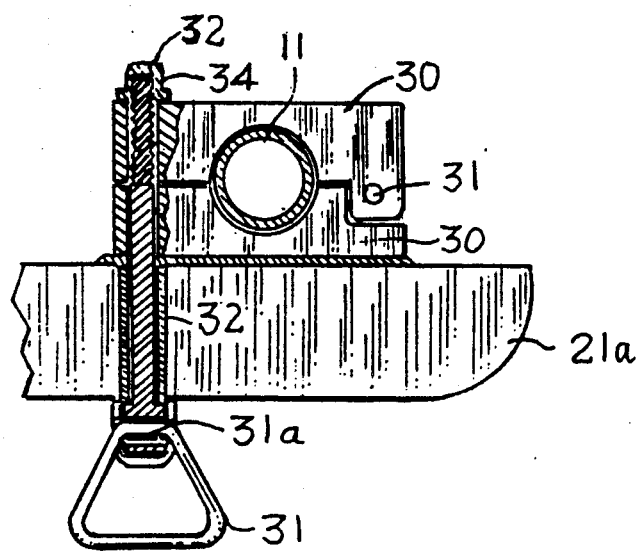
FIG. 8 is a side elevational view with partial cutaway section illustrating the clamping device of the preferred embodiment.
Figure 9:
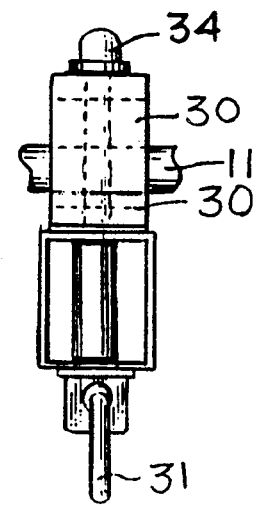
FIG. 9 is an end elevational view of the clamping device of FIG. 8.

Referring now to FIGS. 3, 8, and 9, the handlebar is attached to the extension 21a of exerciser post 21 by means of clamp 24. The handlebar is adjustable to any desired pivotal position as shown, for example, in FIGS. 4-7, and when set in the desired position clamped to the post by means of clamp 24. Clamp 24, as can best be seen in FIGS. 8 and 9, comprises a pair of jaws which are pivotally connected at pivot point 31 and which are fitted around knurled portion 11a of central bar 11. One of jaws 30 is welded to post extension 21a. Jaws 30 are tightened against the knurled portion of the bar by means of handle 31. Handle 31 has a rod 32 pivotally connected thereto. Handle 31 has an eccentric portion 31a so that when the handle is rotated, rod 32 is drawn towards the handle thereby drawing clamping member 34 against the jaws to clamp them to the central bar 11. Clamping member 34 is threadably attached to the end of rod 32 to permit adjustment of this member longitudinally along the rod.

Referring now to FIGS. 4-7, various positions to which the handlebars can be set are shown. It should be apparent that these are only a few of many positions for the handlebars and are illustrative of the versatility of the device of the invention.

While the invention has been described and illustrated in detail, it is to be clearly understood that this is intended by way of illustration and example only and is not to be taken by way of limitation, the scope of the invention being limited only by the terms of the following claims.

I claim:

1. In combination, a vertically oriented post for a stationary exercise bicycle and handlebars for said exercise bicycle comprising:
   a central bar member,
   means for supporting said bar member for pivotal adjustment on said post about an axis substantially normal to the longitudinal axis of said post,
   a first larger handle bar section in the form of a first loop, the ends of said first loop being attached to the opposite ends of said central bar member,
   a second smaller handlebar section in the form of a second loop, the ends of said second loop being attached to the ends of said central bar member, said second handlebar section being located on an opposite side of said central bar member from said first handlebar section, and
   means for clamping said bar member to the post of said exercise bicycle in any desired pivotal position about said axis relative thereto.

2. The handlebars of claim 1 wherein said first handlebar section has a pair of substantially straight sides which diverge outwardly from the central bar member and a third side opposite said central bar member which has a recessed portion.

3. The handlebars of claim 1 wherein said second handlebar section has a pair of substantially straight sides which converge towards each other and a third side interconnecting said pair of sides which is positioned opposite the central bar member.

4. The handlebars of claim 1 wherein the means for clamping the central bar member of said handlebars to the post of said exercise bicycle comprises a clamping member having a pair of jaws and means for releasably clamping said jaws to said central bar member in a selected pivotal position.

* * * * *